Jan. 20, 1959   F. M. WAGNON   2,869,307
COTTON HARVESTING AND CLEANING MACHINE
Filed April 29, 1955   4 Sheets-Sheet 1

INVENTOR.
Francis M. Wagnon.
BY
Attorney.

Jan. 20, 1959  F. M. WAGNON  2,869,307
COTTON HARVESTING AND CLEANING MACHINE
Filed April 29, 1955  4 Sheets-Sheet 2
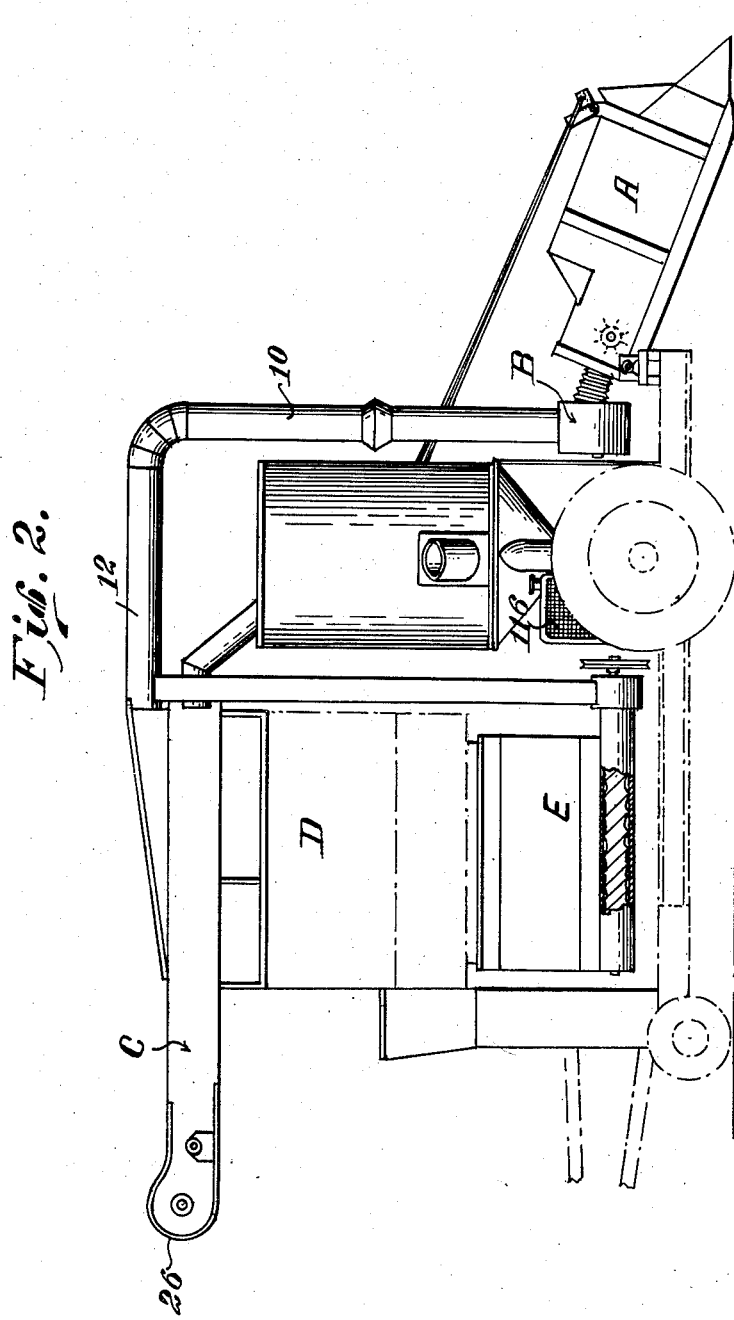
INVENTOR.
Francis M. Wagnon
BY
Attorney.

Jan. 20, 1959 F. M. WAGNON 2,869,307
COTTON HARVESTING AND CLEANING MACHINE
Filed April 29, 1955 4 Sheets-Sheet 3

INVENTOR.
Francis M. Wagnon.
BY
Attorney.

Jan. 20, 1959 F. M. WAGNON 2,869,307
COTTON HARVESTING AND CLEANING MACHINE
Filed April 29, 1955 4 Sheets-Sheet 4

INVENTOR.
Francis M. Wagnon
BY
John N. Mason
Attorney.

United States Patent Office 2,869,307
Patented Jan. 20, 1959

2,869,307

COTTON HARVESTING AND CLEANING MACHINE

Francis M. Wagnon, Borger, Tex.

Application April 29, 1955, Serial No. 504,834

9 Claims. (Cl. 56—30)

The present invention relates to improvements in a cotton harvester.

An object of the present invention is to provide an improved cotton stripper mechanism.

A further object is to provide means in combination with stalk stripper means for conveying the cotton and extraneous material, and to separate the cotton from said material during transit of the same from the stalk stripper means to a cotton boll separating and cleaning mechanism.

Yet another object is to provide in combination with one or more of the foregoing mechanisms, a gin stand.

An additional object is to provide a cotton baler in combination with the cotton stalk stripper mechanism and one or more other mechanism.

Yet another object is to provide a machine of the type described in which the combination includes a mobile cotton picking, stripping, boll breaking, cleaning, ginning, condensing and baling means, particular novelty residing in the cleaning mechanism in combination with these units.

Other objects will appear hereinafter throughout the specification.

In the drawings:

Figure 7 is an enlarged horizontal section of the ginning mechanism taken on the line 7—7 of Figure 3.

Figures 1, 2:
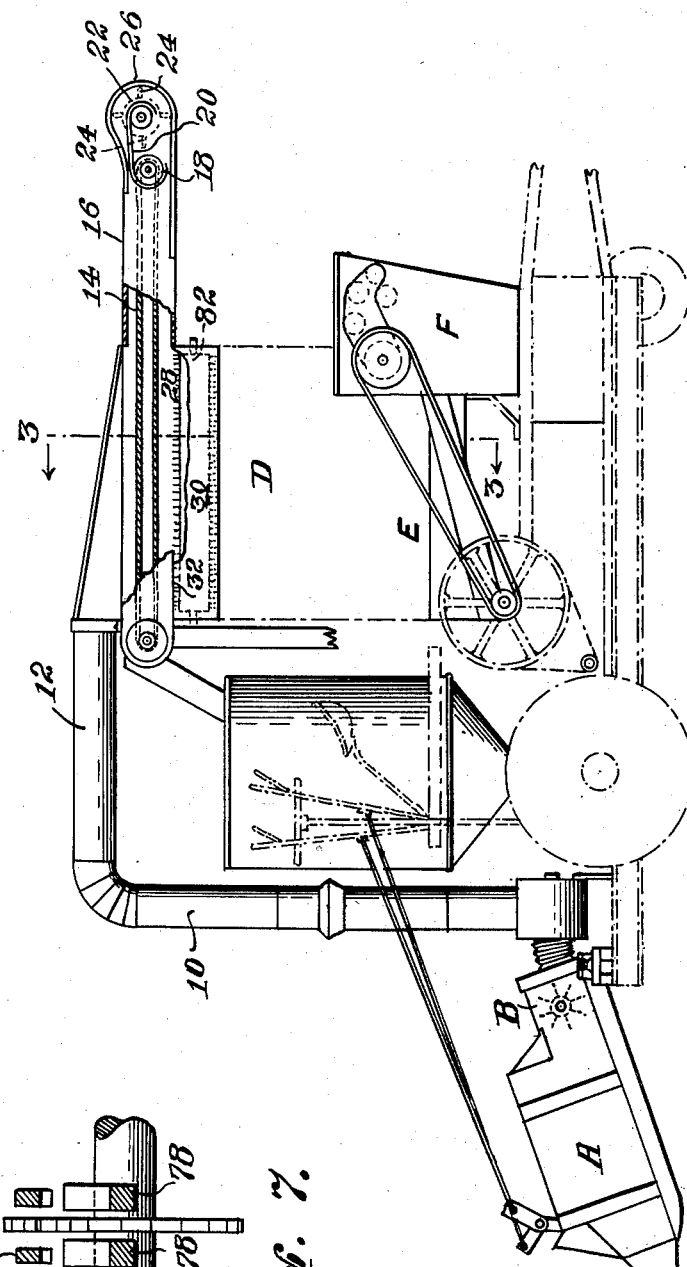
Figure 1 is a side elevation of the machine with parts broken away and shown in section.
Figure 2 is a side elevation of the machine shown in Figure 1 but from the opposite side thereof with parts broken away and shown in section.

The cotton harvester of this invention is constructed of a plurality of units which are operatively connected to each other, and which pick or strip the cotton from the stalks, convey and partially clean the cotton, rid the cotton of debris, and separate and break the cotton bolls from the cotton in transit, clean the cotton, gin the cotton, card the cotton, and finally compress the cleaned cotton to form a bale.

Referring to the drawings, the several units are indicated as follows: The cotton stripping mechanism is shown at A, the cotton conveyor and fan unit is shown at B, the combined conveyor and cotton boll breaker unit is shown at C, the cotton boll separating and cotton cleaning mechanism is shown at D, the cotton gin stand is shown at E, the cotton condenser is shown at F, and the cotton compressor or baling mechanism is shown at G.

The cotton is stripped from the stalks by a plurality of units, one of said units being shown in Figure 2, and a unit on the opposite being indicated in Figure 1. Each of these units strips the cotton from a row of stalks, so that two rows are simultaneously stripped of cotton. The cotton is then picked up by the elevating conveyor fan unit B, preferably comprising a pair of fans which are driven by take-off drive mechanism of the cotton harvester.

Figure 8:
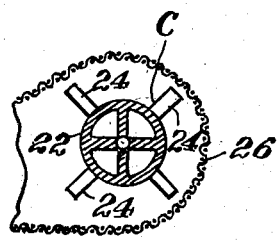
Figure 8 is an enlarged side elevational view partly in section of the boll breaker shown in Figures 1 and 2.

These fans partially remove the sticks and other debris from the cotton and convey it upwardly through vertical pipe 10 and along horizontal pipe 12. At the end of this pipe 12 is a conveyor belt 14 travelling within casing 16. As the cotton is dumped on the upper run of the belt, it moves to the right, as shown in Figure 1, where it is engaged by the combined conveyor and boll breaker C. The end of the conveyor belt passes over the roller 18 that forms a drive roller for the drive belt 20, which latter drives a roller 22 having a plurality of radially extending teeth 24, as shown in detail in Figure 8. When the cotton, which is rolled along the upper run of the belt 14 by air from blower unit B, and which is also partially conveyed by the said upper run, reaches the boll breaker, the teeth 24 breaking the bolls as the cotton is rolled around by the boll breaker.

Most of the air from the blower unit B finds its way out of the screen 26 that forms the end of casing 16, said screen partially surrounding the rotating boll breaker. The cotton is carried along the underside of the conduit or pipe 16 until it reaches the opening 28, shown in Figures 1 and 3. The cotton is then dumped onto a feeder drum 30 having a plurality of radially extending teeth 32.

Located on one side of the feeder drum is a screen 34. This drum feeds the cotton onto the rotating fan beater or fluffer 36 which beats and throws the cotton against the curved screen 38. While the feeder drum 30 rotates in a counter-clockwise direction so as to force the air through the screen 34, the fluffer 36 rotates in a clockwise direction which causes movement of the air toward the curved screen 38, thus blowing out additional trash through this screen. The cleaned cotton is then dropped onto the inclined sides 40 and 42 that form part of the top of the cotton extractor D.

Located in the housing or inclosure of the cotton extractor, immediately below the inlet opening 44 to the extractor, are rotating saws 46 which rotate in a counter-clockwise direction as viewed in Figure 3. Rotating in a clockwise direction, to the right of and slightly above the saws, is the rotating brush 48, and located to the left of said saws is the rotating stripper 50. The axis of the stripper is at a forty-five degree angle from a horizontal line extending through the axis of the saws and is below and to the left of said axis. The stripper rotates in a counter-clockwise direction. Located immediately below the stripper is the stationary inclined screen 52 which deflects stripped cotton to the space 54 formed at the right lower end of the separator or extractor, which forms part of the gin stand.

A second set of saws 56 are located slightly above and to the left of the stripper 50 and located below these saws is a second brush 58. A second stripper 60 is mounted in the casing to the left of the second set of saws and the second brush. This stripper rotates in a counter-clockwise direction and has provided immediately below the rotating blades thereof a second inclined screen 62. Located to the left of the stripper 60 and slightly below the axis of the second saws is a third set of saws 64. Beneath and slightly to the right of these third saws is a third brush 66, and to the left of both of elements 64 and 66 is a third stripper 68.

It will be noted that each of the strippers 50, 60 and 68 is located to the left of and below the saws 46, 56 and 64, respectively, and that the periphery of each saw is substantially tangent to the path of the teeth of the stripper which lies below its saw.

Located to the left of the third saws 64 and slightly above its stripper 68 is the stationary curved screen 70. The purpose of this screen is to direct any cotton which is moved to the left by the saws 64 downwardly onto the stripper 68. Located below saws 64, brush 66 and stripper 68 is an inclined wall 72 which extends across the entire casing and which is provided with a trough 74 for the reception of a rotating worm 76, which worm acts to carry seeds, which fall into the trough 74, out of the casing.

Cotton from each set of saws, brushes, and strippers falls into the space 54. The cotton locks which are freed from some of the seeds and which are in the space 54 are engaged by the brush 82 which is rotating in a counter-clockwise direction and are forced into the saws 84, which comprise a plurality of individual saws spaced horizontally from each other along the shaft upon which they are mounted. Saws 84 rotate between the bars or ribs 78 and 80, as shown in Figures 3 and 7.

The cotton locks roll along between the two rows of bars with the saws 84 taking the lint off of the seed. The left row of bars 78 are preferably more closely spaced from each other than the right row 80, and the left row prevents further movement to the left of the seeds, because of this closer spacing of the bars. The seeds fall into the seed outlet 86 onto the ground. The rotating saws 84 continue to engage the cotton and move the cotton to the left into the space 88 where it is engaged by the rotating brush 90 and moved toward the outlet opening 92, which forms the inlet to conduit 94 leading to the condenser F.

It will be noted that the entire lower portion of the separator and cleaning mechanism D forms the gin stand E. In other words, the inclined wall 72 and the upper inclined portion 96 of bars 80 form the top of the gin stand, the operating parts of which include the brush 82, saws 84, brush 90 and bars 78 and 80. As seen in Figure 3, the vertical wall is provided with an opening 98 forming the outlet for surplus air within the gin stand.

Figure 4:
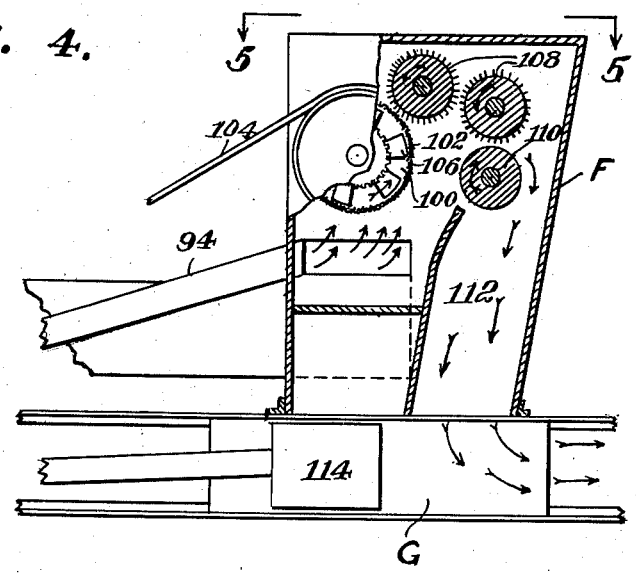
Figure 4 is an enlarged side elevational view with parts broken away and shown in section of the cotton condenser and cotton press box or baling mechanism.
Figure 6:
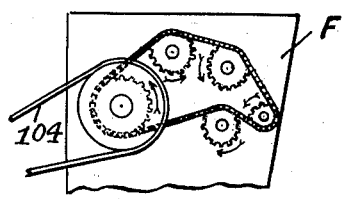
Figure 6 is a side elevational view of the condenser drive mechanism taken on the line 6—6 of Figure 5.
Figure 5:
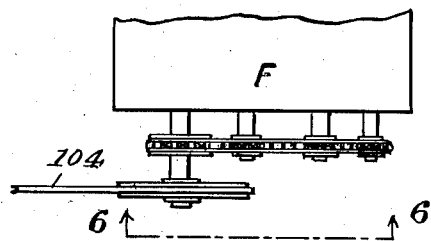
Figure 5 is a top plan view partly broken away of the drive means for the condenser, taken on the line 5—5 of Figure 4.

As noted above, the ginned cotton is conveyed up the pipe 94 to the condenser F, as shown in Figure 4. This is shown as a casing having a horizontal outlet opening 100. A rotating drum 102, whose periphery is covered with screening as shown in Figure 4, is rotated by the belt 104. Located within the drum is a fan 106. Surplus air in the condenser F is separated from the cotton by passing through the perforations of the drum 102 and out of the opening 100 assisted by the fan 106. The cotton is engaged by the carding rollers 108, which both rotate in the same direction as shown in the figures. After the cotton has been carded by these rollers, the lowermost roller of the pair deposits the cotton on the feed roller 110, which latter rotates clockwise and causes the cotton to fall down the condenser outlet means 112 to the cotton compressor or press box G.

The press plunger 114 is reciprocated by any conventional press plunger reciprocating means. This press plunger, as well as all of the rotating rollers and other moving parts, are operated by take-off power drives from the power source of the self-propelled cotton gin harvester, or by a separate source of power, not shown, on the machine.

The cotton is compacted into bales or other packages in the press box and may be periodically deposited on the ground or in a suitable receptacle, not shown. The power source for propelling the vehicle, as well as driving the several units, is diagrammatically indicated by the numeral 116 in Figure 2.

Figure 3:
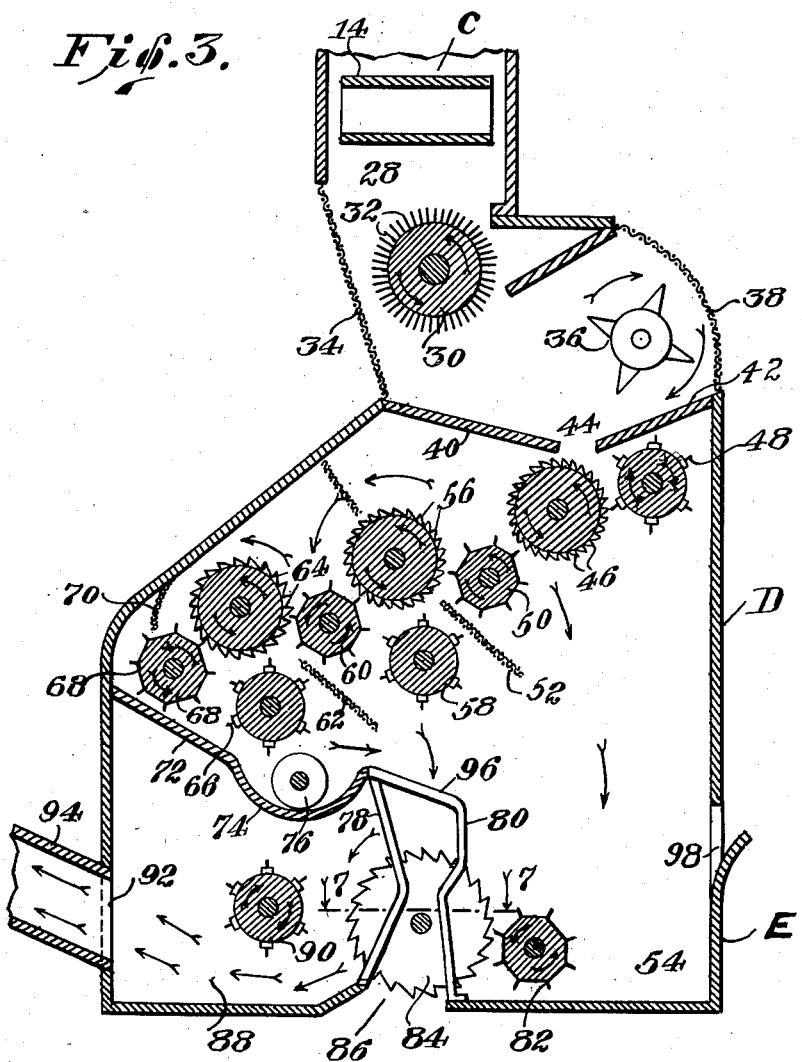
Figure 3 is an enlarged vertical sectional view taken on the line 3—3 of Figure 1 of the cotton boll separating and cotton cleaning mechanism.

Referring to Figure 3, which shows the combined cotton cleaning unit and cotton gin stand unit, it will be noted that each set of rotating saws 46, 56 and 64 comprises horizontally spaced rows of circumferentially arranged teeth. Each saw element 46, 56 and 64 grasps the cotton and picks some of the cotton while the remaining cotton and burrs are stripped from the saw teeth by the strippers 48, 58 and 66, respectively. The remaining burrs and cotton are carried around, away from the first saws, and allowed to move downwardly and to the left to the nearest saw unit, and so on. The stripper takes part of the cotton out with the burrs and the saw carries the cotton on around to the brush.

The brush takes the cotton off the saw and permits it to fall to the gin stand, but the operation of the saws, strippers and brushes is such that the cotton is acted on a plurality of times as it moves downwardly and to the left, as shown in Figure 3. The separation is such that a comparatively clean cotton moves to the gin stand E, while the burrs and other debris are moved to the outside of the machine by the worm 76 moving in trough 74.

It will be noted that the present arrangement eliminates many of the parts considered necessary in devices of this type, for instance, there are only three sets of saws, strippers and brushes in the cotton cleaning mechanism D, and it will be noted that to the left of each set is a screen. The three saw units are arranged in a descending or inclined plane as are the three stripper units. The second and third saw units are provided with brush means substantially directly below each unit, but the first saw unit is provided with a brush unit in an elevated position therefrom.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. For use with a cotton combine including a picking means, a cleaning and ginning means, and cotton collecting and baling means, an improved cleaning means comprising an inclosure having an inlet opening in a top portion thereof, a cleaning saw below said opening, a doffing brush operatively associated with said saw adjacent one side thereof, a rotary stripper adjacent an opposite and bottom portion of said saw, at least one additional cleaning saw, rotary stripper and doffing brush spaced downwardly and laterally of said first mentioned saw and adjacent said rotary stripper, and a ginning means in said inclosure below said cleaning saws.

2. The structure of claim 1 wherein said inclosure has a cotton outlet.

3. The structure of claim 1 wherein said cleaning means includes at least three sawing means, each sawing means having a doffing brush and a stripper.

4. The structure of claim 1 wherein said cleaning means includes at least three cleaning saws, each saw having a doffing brush adjacent one portion of the saw periphery and a rotary stripper on the opposite side thereof.

5. The structure of claim 4 wherein each stripper is located below and offset from its cleaning saw.

6. The structure of claim 4 wherein said inclosure is provided with a downwardly inclined wall located below said cleaning saws, and a rotating worm mounted above said inclined wall whereby to convey seeds out of said inclosure.

7. The structure of claim 1 wherein said inclosure is provided with a plurality of inclined screens.

8. The structure of claim 7 wherein one of said inclined screens is located between one of said strippers and one of said brushes.

9. The structure of claim 1 wherein at least two of said cleaning saws are each located below and to one side of another of said saws.

References Cited in the file of this patent

UNITED STATES PATENTS

| | | |
|---|---|---|
| 1,314,437 | Silverthorne | Aug. 26, 1919 |
| 2,672,719 | Wagnon | Mar. 23, 1954 |
| 2,707,364 | Wagnon | May 3, 1955 |